(12) United States Patent
Sang et al.

(10) Patent No.: US 11,983,421 B2
(45) Date of Patent: May 14, 2024

(54) CONFIGURATION OF FRONTEND SERVICES IN STORAGE NODES

(71) Applicant: HEWLETT PACKARD ENTERPRISE DEVELOPMENT LP, Houston, TX (US)

(72) Inventors: Xiaokang Sang, Durham, NC (US); Tao Jin, Durham, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 181 days.

(21) Appl. No.: 17/650,167

(22) Filed: Feb. 7, 2022

(65) Prior Publication Data

US 2023/0251784 A1 Aug. 10, 2023

(51) Int. Cl.
*G06F 3/00* (2006.01)
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,146,527 B2 | 12/2018 | Olarig et al. | |
| 10,210,123 B2 | 2/2019 | Olarig et al. | |
| 10,387,353 B2 | 8/2019 | Olarig et al. | |
| 10,444,722 B2 | 10/2019 | Guim Bernat | |
| 10,893,105 B1 | 1/2021 | Bono et al. | |
| 10,936,522 B1* | 3/2021 | Iqbal | G06F 13/4027 |
| 11,386,023 B1* | 7/2022 | Tarikere | G06F 13/1668 |
| 2019/0102107 A1 | 4/2019 | Guim Bernat | |
| 2019/0272247 A1 | 9/2019 | Olarig et al. | |
| 2019/0384532 A1 | 12/2019 | Ananthapalli et al. | |
| 2020/0065269 A1 | 2/2020 | Balasubramani et al. | |
| 2020/0249846 A1 | 8/2020 | Bhatia et al. | |
| 2023/0229341 A1* | 7/2023 | Chen | G06F 3/0655 |
| | | | 711/113 |

OTHER PUBLICATIONS

Mulford, Juan, "What is NVMe-oF?," StorageReview, Jul. 27, 2020 (10 pages).
NVM Express Workgroup, "NVM Express Technical Proposal for New Feature," Technical Proposal ID TP 4034, Jul. 22, 2021 (55 pages).

(Continued)

*Primary Examiner* — Midys Rojas
(74) *Attorney, Agent, or Firm* — Trop, Pruner & Hu, P.C.

(57) ABSTRACT

In some examples, a system causes execution, in each respective storage node of a cluster of storage nodes, of a respective frontend service that provides a frontend to a client over a network for access by the client of a storage volume accessible by the cluster of storage nodes. The system obtains node-specific configuration data portions from a configuration data repository, the node-specific configuration data portions being for respective storage nodes of the cluster of storage nodes, and sends the node-specific configuration data portions to the respective frontend services for configuring the frontend services.

20 Claims, 4 Drawing Sheets

(56) References Cited

OTHER PUBLICATIONS

Stern, Jonathan, "Introduction to the Storage Performance Development Kit (SPDK)," Dec. 5, 2016 (5 pages).
Spdk.io, "Block Device User Guide", available online at <https://web.archive.org/web/20220120085701/https://spdk.io/doc/bdev.html>, 14 pages.
Wikipedia, "Cache (computing),", available online at <https://en.wikipedia.org/w/index.php?title=Cache_(computing)&oldid=1068640278>, Jan. 29, 2022, 10 pages.
Wood et al., "Caching data and configuration settings with AWS Lambda extensions,", <https://aws.amazon.com/blogs/compute/caching-data-and-configuration-settings-with-aws-lambda-extensions/>, Mar. 2, 2021, 10 pages.

* cited by examiner

CONFIGURATION OF FRONTEND SERVICES IN STORAGE NODES

BACKGROUND

A storage system can include a number of storage nodes that can manage access of data in an array of storage devices. Each storage node includes control functionality that allows for a client to access the array of storage devices using the storage. Each storage node can be considered a storage controller that manages access of storage device(s) in response to requests.

BRIEF DESCRIPTION OF THE DRAWINGS

Some implementations of the present disclosure are described with respect to the following figures.

Figure 1:
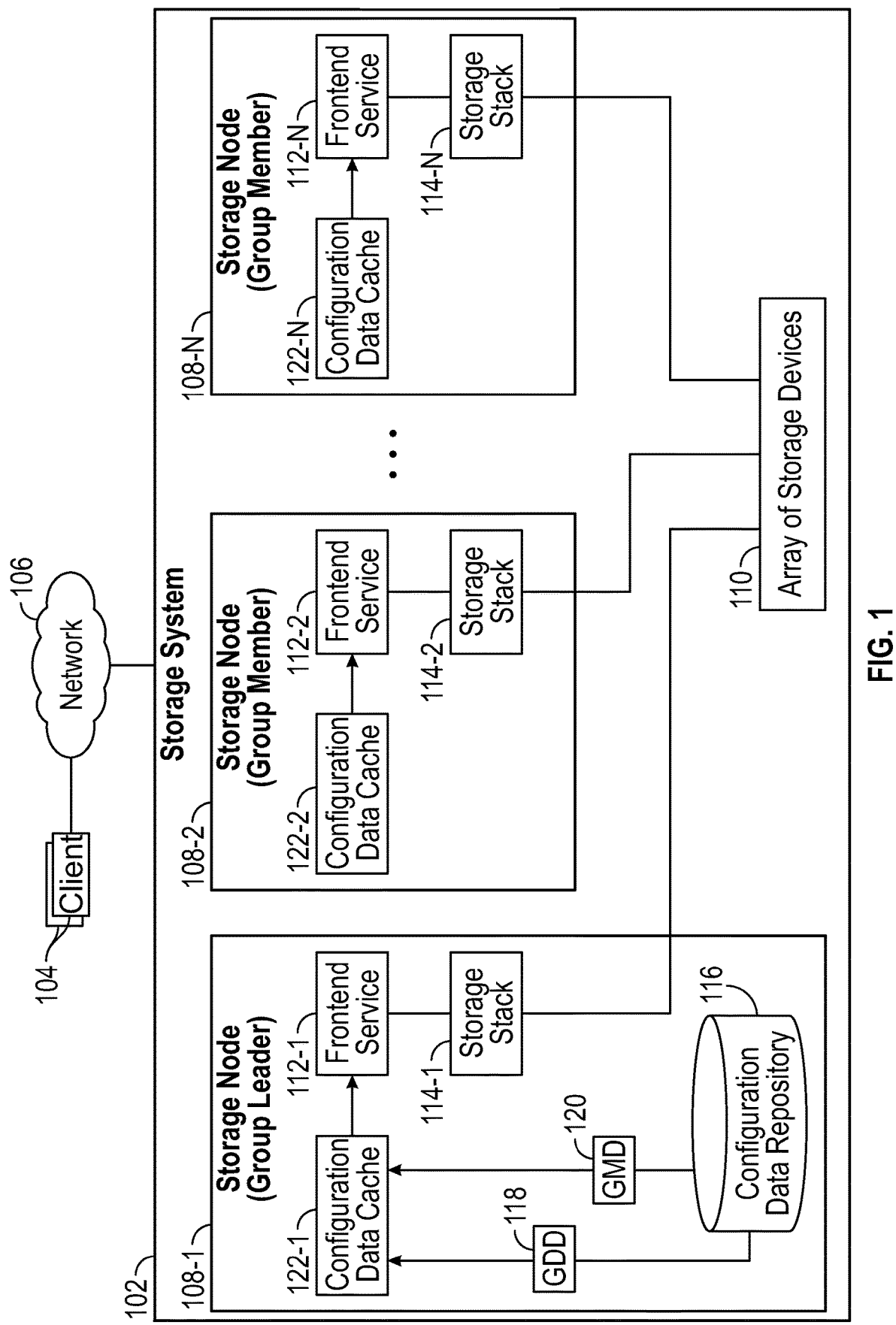
FIG. 1 is a block diagram of an arrangement that includes a cluster of storage nodes, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Providing a cluster of storage nodes in a storage system can provide various benefits. In some examples, failover redundancy can be provided in the cluster, in which a first storage nodes of the cluster can be designated as an active storage node (or equivalently, an active storage controller) and a second storage node of the cluster can be designated a standby storage node (or equivalently a standby storage controller). The standby storage node can take over the tasks of the active storage node if the active storage node were to experience a fault that prevents further correct operation.

Additionally, a cluster of storage nodes can be associated with a single control plane that allows for management of the cluster of storage nodes using the control plane. A "control plane" can refer to any management system associated with the cluster of storage nodes that allows for an administrator or another entity to manage the cluster of storage nodes.

A cluster of storage nodes can also improve data access throughput with respect to an array of storage devices. The cluster of storage nodes can allow different clients (or even one client) to access the array of storage devices across multiple data paths through the storage nodes in the cluster.

A "storage device" can refer to an individual storage device, such as a disk-based storage device (e.g., a hard drive, an optical drive, etc.), a solid state drive (SSD), and so forth. Multiple storage devices can be arranged as an array of storage devices. Generally, an "array" of storage devices can refer to any collection of multiple storage devices across which data can be stored.

A storage node manages access (read or write) of data stored in a storage device (or multiple storage devices). In some examples, a storage node can be implemented with a computer (or multiple computers) in which programs are executed for managing access of data stored in a storage device (or multiple storage devices).

Collectively, storage node(s) and storage device(s) can be part of a "storage system."

A "client" can refer to an entity that is able to interact with a storage system. A client can refer to a computer (e.g., a server computer, a user computer, etc.), a program (including machine-readable instructions), or any other type of entity that is able to access data in a storage system.

Non-Volatile Memory Express (NVME) refers to a protocol for accessing a storage system. A storage system that is able to process NVME commands (e.g., read commands, write commands, administrative commands, etc.) from a client is referred to as an "NVME storage system." As an example, NVME over Fabrics (NVME-oF) is a protocol that allows a client to access a storage system over a network using the NVME protocol.

Note that NVME defines an NVME host and an NVME target (which can be part of a storage system accessible by a client). An NVME host refers to an entity (machine or program) that is able access an NVME target (e.g., a storage device or a collection of storage devices). For example, an NVME host can be a storage controller (e.g., a storage node in a cluster of storage nodes). A client is able to send requests to the NVME host to access data stored in a NVME target (i.e., storage device(s)).

Using NVME-oF, data and commands according to NVME can be communicated between a client and a storage system over a network, such as an Ethernet network, a Fibre Channel (FC) network, and so forth. Ethernet and FC are examples of protocols that govern data communications over a network. In other examples, NVME-oF can support NVME data transfer between clients and storage systems over other types of networks.

Although reference is made to NVME and NVME-oF in the ensuing discussion, it is noted that in other examples, other protocols that support data transfers and storage device management between clients and storage systems over networks can be employed.

A storage node can execute various different types of programs. A "program" refers to machine-readable instructions, implemented using a single module or multiple modules. The programs can be part of a storage stack. The programs of the storage stack can perform various respective functionalities. Examples of programs of the storage stack can include a program that responds to requests (e.g., read requests, write requests, etc.) from clients by issuing respective commands to an array of storage devices, a program that supports redundancy and failover to handle faults where an active storage node is failed over to a standby storage node in a cluster of storage nodes, forwarding a request received from a client from a first storage node to a second storage node, and so forth. The programs of the storage stack can implement support for various protocols used to access storage device(s), such as NVME, Small Computer System Interface (SCSI), and so forth.

The storage stack can be considered a "backend service" of a storage node, where the backend service is responsible for interacting with the array of storage devices as well as perform other tasks as noted above. A storage node can also include a "frontend service," which interacts with clients over a network. In examples where NVME-oF is employed, the frontend service supports NVME-oF interactions with clients.

A frontend service can include various programs, referred to as "frontend programs," that provide the functionalities for interacting with hosts. In some examples, the frontend service can be implemented using open source programs, such as programs developed using the Storage Performance Development Kit (SPDK). SPDK provides a set of tools and libraries for developing storage programs (e.g., NVME device drivers, etc.) for a frontend service of a storage node. A frontend service developed using SPDK can be referred to as an SPDK frontend service.

In some examples, the programs of a frontend service (such as an NVME device driver) can be user space programs. A user space program allows a client to interact with the user space program without going through an operating system (OS) kernel of a storage node. An OS kernel is part of an OS that controls various aspects of the storage node. The OS kernel controls interactions between hardware components and machine-readable instructions. The OS kernel is one of the first programs loaded on startup of the storage node, after system firmware in the storage node has been loaded to perform initialization of the storage node.

Although reference is made to SPDK and user space programs, it is noted that in other examples, other types of frontend services may be employed.

The storage stack and frontend service in a storage node may be from different sources. A storage node (and the storage stack in the storage node) may be provided (manufactured, developed, etc.) by a first vendor. The frontend service in the storage node may be from a source different from the first vendor. From the perspective of the first vendor, the source of the frontend service is considered a "third party."

When frontend services in storage nodes of a cluster of storage nodes are from a source different from a source of the storage stack used in the storage nodes, it may be challenging to configure the frontend services to properly work with the storage stack. Configuring a frontend service can include providing configuration data to the frontend service so that the front and service is able to perform storage operations in a storage system.

Assuming an example where NVME is employed, configuration data used to configure a frontend service in a storage node can include any or a combination of the following: NVME namespace properties, NVME subsystem properties, NVME host properties, NVME namespace access control information, NVME transport portal information, and so forth. The foregoing are examples of NVME-oF configuration data.

An NVME namespace is considered a storage volume, and can refer to a portion of a storage medium (implemented in one or more storage devices) that may be formatted into logical blocks. An NVME namespace can be shared by multiple hosts or can be private for a given host. Properties of an NVME namespace can include any or a combination of a namespace identifier (NSID), a storage capacity of the NVME namespace, and so forth.

An NVME subsystem includes a storage controller (or multiple storage controllers), a namespace (or multiple namespaces), NVME subsystem ports, an NVME storage, and an interface between the storage controller(s) and the NVME storage. Properties of an NVME subsystem can include an identifier of the NVME subsystem, such as an NVME Qualified Name (NQN), and so forth.

Properties of an NVME host can include an identifier of the NVME host, such as a host NQN, and so forth.

NVME transport portal information can refer to information that a remote client can use to access an NVME storage system. Examples of NVME transport portal information include an Internet Protocol (IP) address, transport port information (e.g., Transmission Control Protocol (TCP) port information), and so forth.

NVME namespace access control information can define access control permissions for accessing NVME namespaces in each NVME subsystem. For example, the access control permissions can specify which NVME hosts (e.g., storage nodes of a cluster of storage nodes) are granted access of which NVME namespaces for each NVME subsystem.

In accordance with some implementations of the present disclosure, techniques or mechanisms are provided to obtain node-specific configuration data portions from a configuration data repository, where the node-specific configuration data portions are for respective storage nodes of a cluster of storage nodes. The techniques or mechanisms send the node-specific configuration data portions to respective frontend services in the storage nodes for configuring the frontend services, where each frontend service is to interact with a client over a network for access by the client of a storage volume accessible by the cluster of storage nodes.

FIG. 1 is a block diagram of an example arrangement that includes a storage system 102 that is accessible by clients 104 over a network 106. The network 106 can include a storage area network (SAN), a local area network (LAN), a wide area network (WAN), a public network (e.g., the Internet), and so forth. The clients 104 can refer to programs or machines.

The storage system 102 includes a cluster of storage nodes 108-1, 108-2, ..., 108-N (where N≥2).

The storage system 102 also includes an array of storage devices 110 that can be accessed using any of the storage nodes 108-1 to 108-N. Although reference is made to an array of storage devices in the example of FIG. 1, in other examples, a storage system 102 can include just a single storage device accessible by the storage nodes 108-1 to 108-N.

Each storage node can also be considered to be a storage controller that manages access of the array of storage devices 110 in response to requests (read requests, write requests, management requests, etc.) from clients 104. Each storage node includes a frontend service and a storage stack. The storage node 108-1 includes a frontend service 112-1 and a storage stack 114-1, the storage node 108-2 includes a frontend service 112-2 and a storage stack 114-2, and the storage node 108-N includes a frontend service 112-N and a storage stack 114-N.

In some examples, the frontend services 112-1, 112-2, ..., 112-N can include SPDK frontend services.

Requests submitted by the clients 104 are received by a frontend service in a storage node. In some examples, the requests can include NVME-oF requests.

In the example shown in FIG. 1, the storage node 108-1 is a group leader of the cluster of storage nodes, while the storage nodes 108-2 to 108-N are group members of the cluster. A group leader has functionalities that are not present in the group members (discussed further below). However, the group leader can process requests from clients 104 to access the array of storage devices 110, similar to group members.

In the ensuing discussion, the storage node 108-1 is referred to as a "leader storage node," while the storage nodes 108-2 to 108-N are referred to as "member storage nodes."

In some examples, a functionality that is present in the storage node 108-1 (the group leader) that is not present in the storage nodes 108-2 to 108-N (group members) is a configuration data repository 116 to store configuration data related to the storage system 102. The configuration data repository 116 can be implemented using a storage device or multiple storage devices, including disk-based storage devices, solid state drives, memory devices (e.g., dynamic random access memory (DRAM) devices, static random access memory (SRAM) devices, etc.), and so forth.

As noted above, in examples where NVME is used, configuration data stored in the configuration data repository 116 can include NVME namespace properties, NVME subsystem properties, NVME host properties, NVME namespace access control information, NVME transport portal information, and so forth.

As noted above, a challenge associated with employing frontend services and storage stacks from different sources is in configuring the frontend services to operate properly with the storage stacks when accessing the array of storage devices 110, and more specifically, the storage volumes (e.g., NVME namespaces) in the array of storage devices 110. In accordance with some examples of the present disclosure, the leader storage node 108-1 is able to communicate configuration data to respective storage nodes in the cluster for configuring corresponding frontend services 112-1 to 112-N.

The configuration data in the configuration data repository is global configuration data that relates to all of the NVME namespaces and NVME subsystems provided by the storage system 102. In some examples, different node-specific configuration data portions can be compiled from the configuration data repository 116 for configuring different storage nodes. For example, a first NVME namespace may be accessible by a first storage node of the cluster of storage nodes but not accessible by a second storage node of the cluster of storage nodes. The leader storage node 108-1 may store or have access to information that indicates which storage nodes have access to which NVME namespaces, which NVME subsystems can be used to access specific NVME namespaces, and so forth. As a result, the leader storage node 108-1 can compile a configuration data portion that includes properties of the first NVME namespace, properties of an NVME subsystem that is able to access the first NVME namespace, NVME namespace access control information specifying that the first storage node has access to the first NVME namespace, and so forth, and provide that configuration data portion to the first storage node but not the second storage node. As another example, different storage nodes of the cluster of storage nodes may use respective different network addresses (e.g., IP addresses), which can be used as NMVE-oF target addresses of the storage nodes, for example. The leader storage node 108-1 can also compile different configuration data portions with different network addresses for the respective storage nodes. Different storage nodes of the cluster of storage nodes can be configured differently with different configuration data portions compiled from the configuration data repository 116.

To communicate configuration data to the storage nodes in the cluster, the leader storage node 108-1 includes a group data daemon (GDD) 118 and a group management daemon (GMD) 120. A "daemon" can refer to a program that runs in the background of a computing system to perform tasks. Although reference is made to a "daemon" in some examples, it is noted that the tasks of the daemon (e.g., the GDD 118 and/or the GMD 120) can be performed by any other type of program that includes machine-readable instructions. The GDD 118 is used to provide configuration data portions to each storage node 108-$i$ ($i=1$ to N) as the storage node 108-$i$ is initialized (e.g., initially starts up). The GMD 120 is used to detect updates of the configuration data in the configuration data repository 116, and can send updated configuration data to respective one or more of the storage nodes of the cluster.

More generally, the GDD 118 refers to an entity in the leader storage node 108-1 that provides data path support for the cluster of storage nodes, including any or some combination of performing data redirection for fault tolerance (e.g., failover of storage of data from a first storage node to a second storage in case of a failure of the first storage node) or load-balancing (e.g., balancing storage of data across storage nodes of the cluster to reduce the likelihood of overloading any given storage node), performing reservations of storage volumes (e.g., reserving a storage volume for use by a given client), and so forth. More generally, "data path support" performed by the GDD 118 can include any functionality that affects a path of data to and from storage nodes. The GMD 120 refers to an entity to perform management of storage volumes in the cluster of storage nodes, including any or some combination of creating storage volumes, creating pools of storage volumes (a "pool" of storage volumes includes any collection of storage volumes), performing access control of the storage volumes (e.g., controlling what entity has permission to access a storage volume), so forth.

Although FIG. 1 depicts the use of two different daemons (118 and 120), in other examples, the leader storage node 108-1 can include just one program to communicate configuration data portions to storage nodes of the cluster, during initialization of each storage node 108-$i$ as well as in response to updates of configuration data in the configuration data repository 116.

Each storage node in the cluster has a configuration data cache, which refers to a storage space (either a storage space defined in software or on hardware) to store a configuration data portion for the corresponding storage node. The storage node 108-1 includes a configuration data cache 122-1, the storage node 108-2 includes a configuration data cache 122-2, and the storage node 108-N includes a configuration data cache 122-N.

When a daemon (118 or 120) transmits a configuration data portion to a corresponding storage node 108-$i$, the configuration data portion is stored into the respective configuration data cache 122-$i$. The configuration data in the configuration data cache 122-$i$ can then be used to configure the respective frontend service 112-$i$. For example, the frontend service 112-$i$ can include an application programming interface (API) or another type of interface that can be used to provide configuration data to the frontend service 112-$i$ to configure the frontend service 112-$i$.

Once the frontend service 112-$i$ receives the configuration data from the respective configuration data cache 122-$i$, the frontend service 112-$i$ is configured with NVME namespaces, NVME subsystems, NVME host properties, NVME transport portal information, and so forth, that are useable by the clients 104 to access data in the storage system 102. The clients 104 can query the storage nodes for the configuration data, which can be provided by the respective frontend services. As an example, a client 104 can determine that NVME namespace A is accessible using storage node 108-2, but not storage node 108-N. In this case, the client 104 can send a request to access data of NVME namespace A to the storage node 108-2. The request can be sent by the client 104 to the IP address and TCP port included in the NVME transport portal information, so that the request is directed to the storage node 108-2 through the network 106.

In this manner, clients 104 are presented with a consistent view of which NVME subsystems (and/or NVME namespaces) are accessible through which storage nodes.

Figure 2:
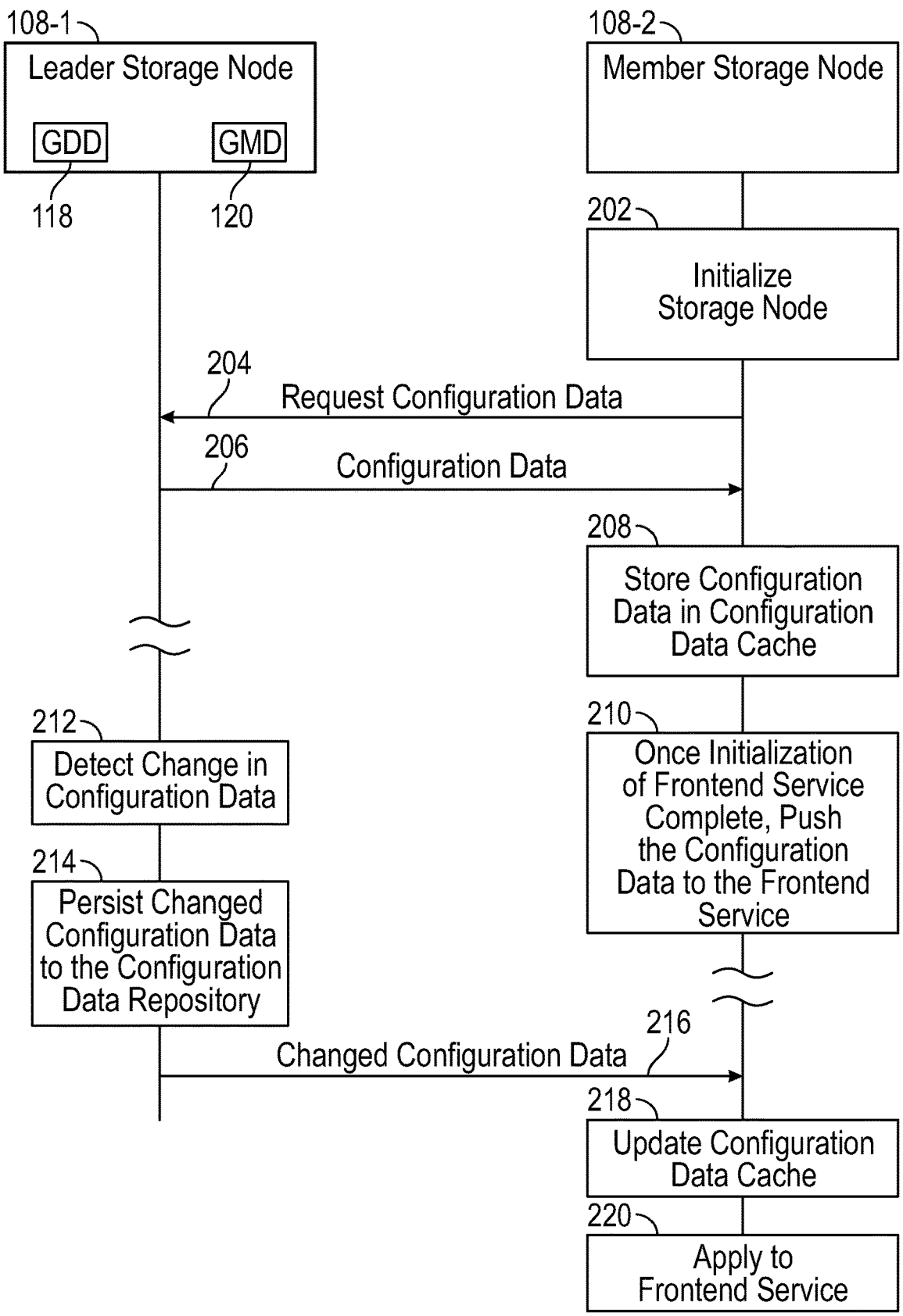
FIG. 2 is a flow diagram of a process performed by a leader storage node and a member storage node, according to some examples.

FIG. 2 is a flow diagram of a process involving the leader storage node 108-1 and the member storage node 108-2 according to some examples. Note that the process can be applied with any other member storage node of the cluster of storage nodes.

When the member storage node 108-2 is initialized (at 202), the member storage node 108-2 requests (at 204) configuration data from the leader storage node 108-1, such as by sending a query to the leader storage node 108-1. Initializing the member storage node 108-2 can refer to initially setting up the member storage node 108-2, such as by loading programs (including the frontend service 112-2 and the storage stack 114-2) into the member storage node 108-2. Note that when the frontend service 112-2 in the member storage node 108-2 is restarted after having been previously initialized, the frontend service 112-2 does not have to query configuration data from the leader storage node 108-1, since the content of the configuration data cache 122-2 can be maintained across the restart of the frontend service 112-2.

In response to the request for the configuration data, the GDD 118 in the leader storage node 108-1 compiles the configuration data portion applicable to the member storage node 108-2. The GDD 118 then sends (at 206) the configuration data portion to the member storage node 108-2.

The member storage node 108-2 stores (at 208) the received configuration data portion in the configuration data cache 122-2 of the member storage node 108-2. Once an initialization of the frontend service 112-2 is complete (from initial start or restart of the frontend service 112-2), the member storage node 108-2 can push (at 210) the configuration data portion in the configuration data cache 122-2 to the frontend service 112-2, such as through an API or another type of interface of the frontend service 112-2.

At this point, the frontend service 112-2 is configured, and is able to accept requests from clients 104 to access data in the array of storage devices 110.

At a later time, the GMD 120 in the leader storage node 108-1 detects (at 212) a change in configuration data. For example, a new NVME namespace may have been added, an existing NVME namespace may have been removed or modified, and so forth. The foregoing are examples of changes in a configuration of the storage system 102 that results in a change in configuration data.

In response to detecting the change in the configuration data, the GMD 120 persists (at 214) the changed configuration data into the configuration data repository 116. The GMD 120 also sends (at 216) the changed configuration data to the member storage node 108-2, assuming the GMD 120 has determined that the changed configuration data is applicable to the member storage node 108-2. For example, the GMD 120 is aware (based on information stored or accessibly by the leader storage node 108-1) that the changed configuration data relates to an NVME namespace that is accessible through the member storage node 108-2. In this case, the changed configuration data is applicable to the member storage node 108-2, and is thus sent to the member storage node 108-2.

In response to receiving the changed configuration data, the member storage node 108-2 updates (at 218) the configuration data cache 122-2. The member storage node 108-2 also applies (at 220) the changed configuration data to the frontend service 112-2, by pushing the changed configuration data from the configuration data cache 122-2 to the frontend service 112-2.

Figure 3:
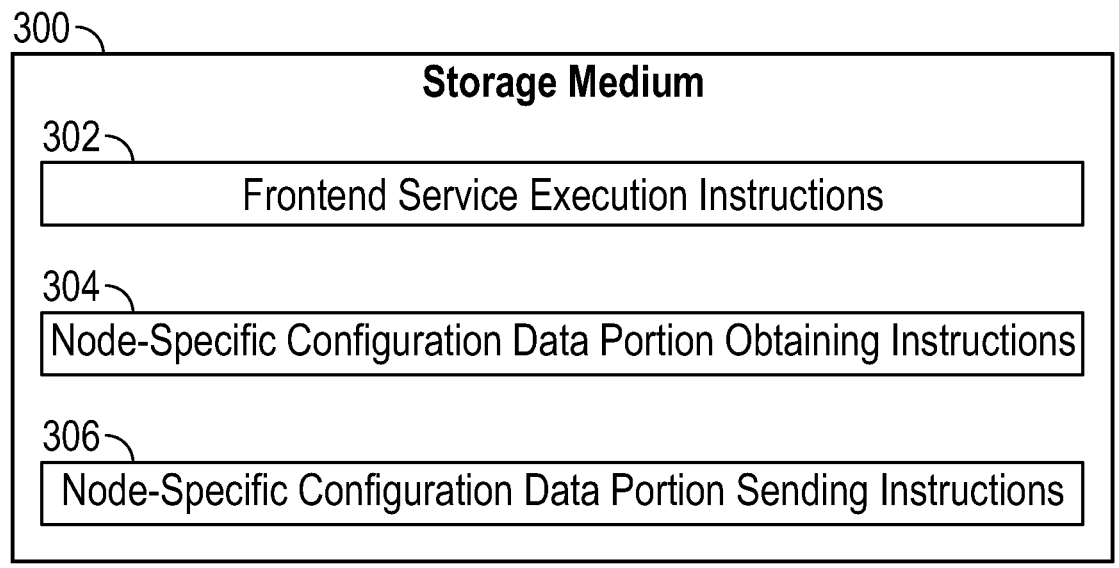
FIG. 3 is a block diagram of a storage medium storing machine-readable instructions, according to some examples.

FIG. 3 is a block diagram of a non-transitory machine-readable or computer-readable storage medium 300 storing machine-readable instructions that upon execution cause a system (a computer or a collection of computers) to perform various tasks.

The machine-readable instructions include frontend service execution instructions 302 to cause execution, in each respective storage node of a cluster of storage nodes, of a respective frontend service (e.g., 112-1 to 112-N in FIG. 1) that provides a frontend to a client over a network for access by the client of a storage volume accessible by the cluster of storage nodes, the respective frontend service to interact with a backend storage stack (e.g., 114-1 to 114-N in FIG. 1) of the respective storage node for access of the storage volume.

The machine-readable instructions include node-specific configuration data portion obtaining instructions 304 to obtain, using a program (e.g., the GDD 118 of FIG. 1), node-specific configuration data portions from a configuration data repository, the node-specific configuration data portions being for respective storage nodes of the cluster of storage nodes. The program (e.g., the GDD 118) provides data path support for the cluster of storage nodes.

The machine-readable instructions include node-specific configuration data portion sending instructions 306 to send the node-specific configuration data portions to the respective frontend services for configuring the frontend services.

In some examples, the configuration data repository is stored in a first storage node (e.g., 108-1 in FIG. 1) of the cluster of storage nodes, and the machine-readable instructions send a first node-specific configuration data portion of the node-specific configuration data portions from the first storage node to the frontend service in a second storage node (e.g., a member storage node 108-2 to 108-N) of the cluster of storage nodes.

In some examples, the configuration data repository is stored in the first storage node but not in any other storage node of the cluster of storage nodes.

In some examples, each frontend service is without support for a multi-storage node arrangement; in other words, the frontend services are not designed to cooperate across a cluster of storage nodes but execute independently in respective storage nodes.

In some examples, the machine-readable instructions transfer the node-specific configuration data portions to respective configuration data caches (e.g., 122-1 to 122-N in FIG. 1) in the respective storage nodes of the cluster of storage nodes.

In some examples, each node-specific configuration data portion includes a property of a respective storage volume (e.g., a namespace identifier, a namespace capacity, etc.), and/or a property of an NVME subsystem, and/or a property of an NVME host, and/or NVME namespace access control information, and/or NVME transport portal information.

In some examples, the frontend services are user space services.

Figure 4:
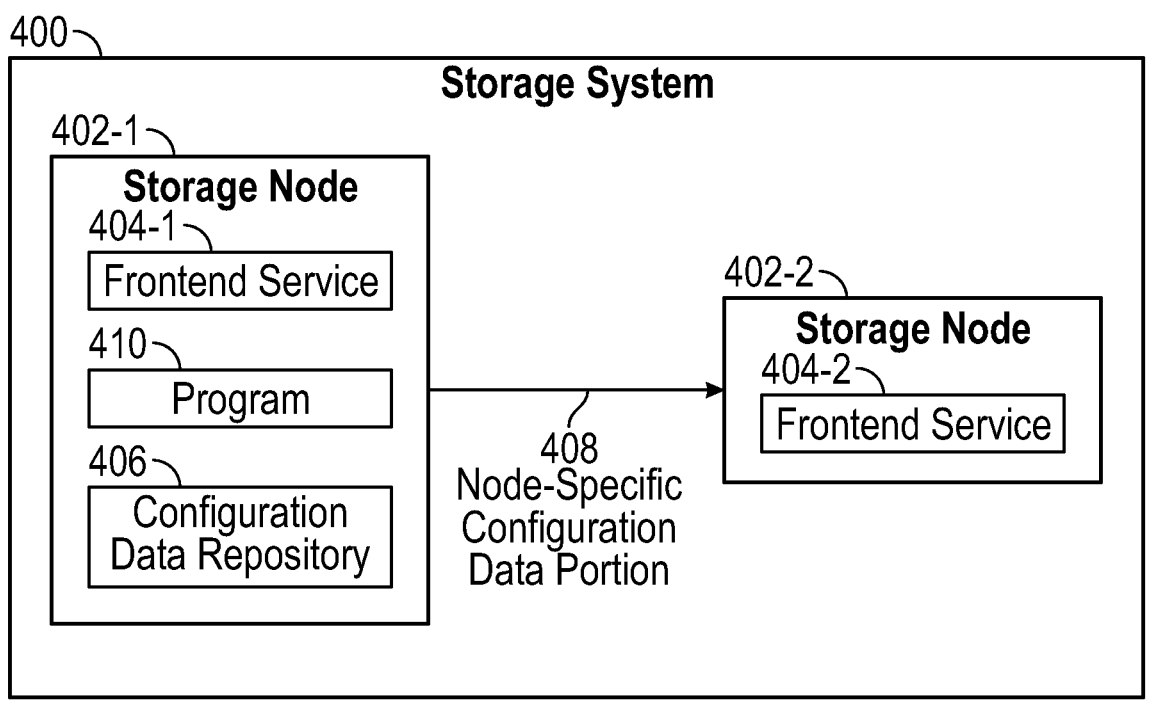
FIG. 4 is a block diagram of a system according to some examples.

FIG. 4 is a block diagram of a storage system 400 that includes a cluster of storage nodes 402-1 and 402-2 that each includes a respective frontend service 404-1 and 404-2 that provides a frontend to a client over a network for access by the client of a storage volume accessible by the cluster of storage nodes, the respective frontend service to interact with a backend storage stack of the respective storage node for access of the storage volume.

The storage node 402-1 is a leader storage node, and the storage node 402-2 is a member storage node. The leader storage node 402-1 includes a configuration data repository 406.

The leader storage node 402-1 includes a program 410 (e.g., the GDD 118 of FIG. 1) executable in the leader storage node 402-1 to obtain a node-specific configuration data portion from the configuration data repository 406, and send the node-specific configuration data portion (408) to the member storage node 402-2. The program 410 is to provide data path support for the cluster of storage nodes.

The member storage node 402-2 provides the node-specific configuration data portion to the frontend service 404-2 in the member storage node 402-2 for configuring the frontend service 404-2 in the member storage node 402-2.

In some examples, the member storage node 402-2 requests the node-specific configuration data portion from the leader storage node 402-1 responsive to an initialization of the member storage node 402-2 or a restart of the frontend service 404-2 in the member storage node 402-2.

In some examples, the leader storage node 402-1 detects a change in configuration data, persists the changed configuration data to the configuration data repository 406, and sends the changed configuration data to the member storage node 402-2 to update a configuration of the frontend service in the member storage node 402-2.

Figure 5:
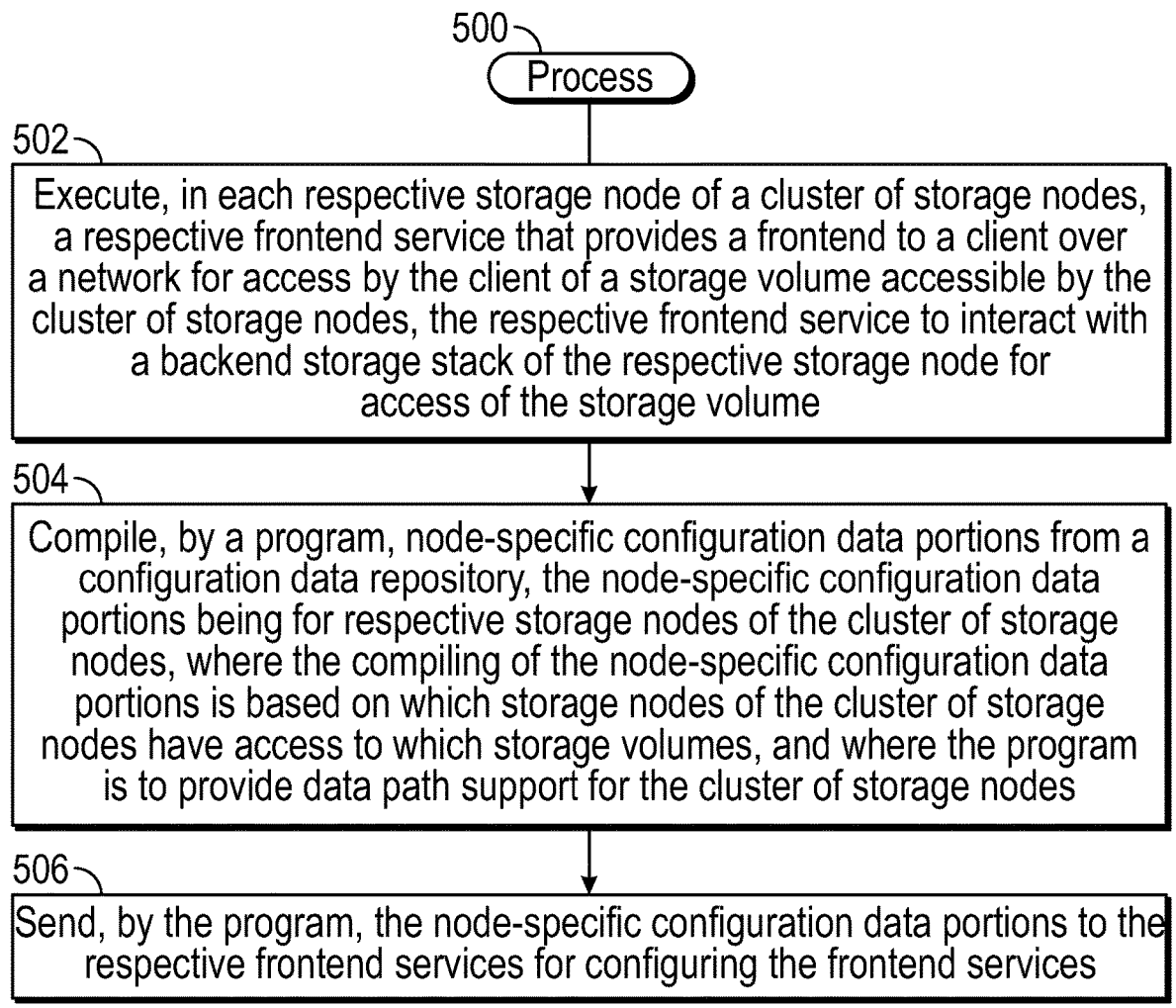
FIG. 5 is a flow diagram of a process according to some examples.

FIG. 5 is a flow diagram of a process 500 according to some examples.

The process 500 includes executing (at 502), in each respective storage node of a cluster of storage nodes, a respective frontend service that provides a frontend to a client over a network for access by the client of a storage volume accessible by the cluster of storage nodes, the respective frontend service to interact with a backend storage stack of the respective storage node for access of the storage volume.

The process 500 includes compiling (at 504), by a program (e.g., the GDD 118 of FIG. 1) node-specific configuration data portions from a configuration data repository, the node-specific configuration data portions being for respective storage nodes of the cluster of storage nodes, where the compiling of the node-specific configuration data portions is based on which storage nodes of the cluster of storage nodes have access to which storage volumes, and where the program is to provide data path support for the cluster of storage nodes.

The process 500 includes sending (at 506), by the program, the node-specific configuration data portions to the respective frontend services for configuring the frontend services.

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

cause execution, in each respective storage node of a cluster of storage nodes, of a respective frontend service that provides a frontend to a client over a network for access by the client of a storage volume accessible by the cluster of storage nodes, the respective frontend service to interact with a backend storage stack of the respective storage node for access of the storage volume;

obtain, using a program in a first storage node of the cluster of storage nodes, node-specific configuration data portions from a configuration data repository, the node-specific configuration data portions being for respective storage nodes of the cluster of storage nodes, wherein the program is to provide data path support for the cluster of storage nodes; and send, using the program in the first storage node, the node-specific configuration data portions to the respective frontend services for configuring the respective frontend services, wherein the sending of the node-specific configuration data portions comprises sending a first node-specific configuration data portion of the node-specific configuration data portions from the first storage node to a frontend service in a second storage node of the cluster of storage nodes.

2. The non-transitory machine-readable storage medium of claim 1, wherein the configuration data repository is stored in the first storage node.

3. The non-transitory machine-readable storage medium of claim 2, wherein the configuration data repository is not in any other storage node of the cluster of storage nodes.

4. The non-transitory machine-readable storage medium of claim 1, wherein the first storage node is a leader storage node of the cluster of storage nodes, and the second storage node is a member storage node of the cluster of storage nodes.

5. The non-transitory machine-readable storage medium of claim 1, wherein the instructions upon execution cause the system to:

transfer the node-specific configuration data portions to respective configuration data caches in the respective storage nodes of the cluster of storage nodes; and provide the node-specific configuration data portions from the respective configuration caches to the respective frontend services.

6. The non-transitory machine-readable storage medium of claim 1, wherein the data path support of the program comprises any or a combination of:

data redirection for fault tolerance or load-balancing, and performing reservations of storage volumes.

7. The non-transitory machine-readable storage medium of claim 1, wherein each node-specific configuration data portion of the node-specific configuration data portions comprises a property of a respective storage volume.

8. The non-transitory machine-readable storage medium of claim 1, wherein each node-specific configuration data portion of the node-specific configuration data portions comprises a property of a Non-Volatile Memory Express (NVME) subsystem.

9. The non-transitory machine-readable storage medium of claim 1, wherein each node-specific configuration data portion of the node-specific configuration data portions comprises a property of a Non-Volatile Memory Express (NVME) host.

10. The non-transitory machine-readable storage medium of claim 1, wherein each node-specific configuration data portion of the node-specific configuration data portions comprises Non-Volatile Memory Express (NVME) namespace access control information.

11. The non-transitory machine-readable storage medium of claim 1, wherein each node-specific configuration data portion of the node-specific configuration data portions comprises Non-Volatile Memory Express (NVME) transport portal information.

12. The non-transitory machine-readable storage medium of claim 1, wherein the frontend services comprise Non-Volatile Memory Express (NVME) device drivers.

13. The non-transitory machine-readable storage medium of claim 1, wherein the instructions upon execution cause the system to:

detect, using a second program, a change to a configuration of a storage system including the cluster of storage nodes, wherein the second program is to perform management of storage volumes in the cluster of storage nodes; and in response to detecting the change, cause, using the second program, an update of a node-specific configuration data portion to a given storage node of the cluster of storage nodes.

14. The non-transitory machine-readable storage medium of claim 13, wherein the instructions upon execution cause the system to:

provide, by the second program, the updated node-specific configuration data portion to the frontend service of the given storage node, wherein the management of the storage volumes by the second program comprises any or a combination of creating storage volumes, creating pools of storage volumes, and performing access control of storage volumes.

15. The non-transitory machine-readable storage medium of claim 1, wherein the frontend services are user space services.

16. A storage system comprising:

a cluster of storage nodes that each includes a respective frontend service that provides a frontend to a client over a network for access by the client of a storage volume accessible by the cluster of storage nodes, the respective frontend service to interact with a backend storage stack of a respective storage node for access of the storage volume, wherein the cluster of storage nodes comprises a leader storage node and a member storage node, the leader storage node comprising a configuration data repository, wherein the leader storage node comprises a program executable in the leader storage node to obtain a node-specific configuration data portion from the configuration data repository, and send the node-specific configuration data portion to the member storage node, wherein the program is to provide data path support for the cluster of storage nodes, and wherein the member storage node is to provide the node-specific configuration data portion to the frontend service in the member storage node for configuring the frontend service in the member storage node.

17. The storage system of claim 16, wherein the member storage node is to request the node-specific configuration data portion from the leader storage node responsive to an initialization of the member storage node or a restart of the frontend service in the member storage node.

18. The storage system of claim 16, wherein the leader storage node comprises a second program to:

perform management of storage volumes in the cluster of storage nodes;

detect a change in configuration data;

persist the changed configuration data to the configuration data repository; and send the changed configuration data to the member storage node to update a configuration of the frontend service in the member storage node.

19. A method comprising:

executing, in each respective storage node of a cluster of storage nodes, a respective frontend service that provides a frontend to a client over a network for access by the client of a storage volume accessible by the cluster of storage nodes, the respective frontend service to interact with a backend storage stack of the respective storage node for access of the storage volume;

compiling, by a program in a first storage node of the cluster of storage nodes, node-specific configuration data portions from a configuration data repository, the node-specific configuration data portions being for respective storage nodes of the cluster of storage nodes, wherein the compiling of the node-specific configuration data portions is based on which storage nodes of the cluster of storage nodes have access to which storage volumes, and wherein the program is to provide data path support for the cluster of storage nodes; and sending, by the program in the first storage node, the node-specific configuration data portions to the respective frontend services for configuring the frontend services wherein the sending of the node-specific configuration data portions comprises sending a first node-specific configuration data portion of the node-specific configuration data portions from the first storage node to a frontend service in a second storage node of the cluster of storage nodes.

20. The method of claim 19, wherein the first node-specific configuration data portion of the node-specific configuration data portions sent to the second storage node is different from a second node-specific configuration data portion of the node-specific configuration data portions sent from the first storage node to third storage node of the cluster of storage nodes.

\* \* \* \* \*